United States Patent
Bruss et al.

(10) Patent No.: US 9,580,023 B2
(45) Date of Patent: Feb. 28, 2017

(54) FASTENING ARRANGEMENT OF A CAMERA ON A FASTENING ELEMENT OF A MOTOR VEHICLE

(75) Inventors: Emil Bruss, Gaertringen (DE); Andre Flemming, Gaertringen (DE); Martin Krug, Karlsruhe (DE); Ulf Ritschel, Bad Liebenzell (DE); Axel Schmidt, Filderstadt (DE)

(73) Assignee: Daimler AG, Stuttgart (DE)

( * ) Notice: Subject to any disclaimer, the term of this patent is extended or adjusted under 35 U.S.C. 154(b) by 368 days.

(21) Appl. No.: 14/234,787

(22) PCT Filed: Jun. 23, 2012

(86) PCT No.: PCT/EP2012/002653
§ 371 (c)(1),
(2), (4) Date: Jan. 24, 2014

(87) PCT Pub. No.: WO2013/013746
PCT Pub. Date: Jan. 31, 2013

(65) Prior Publication Data
US 2014/0169866 A1    Jun. 19, 2014

(30) Foreign Application Priority Data
Jul. 26, 2011  (DE) .................. 10 2011 108 594

(51) Int. Cl.
*G01D 21/00* (2006.01)
*B60R 11/04* (2006.01)

(52) U.S. Cl.
CPC .......... *B60R 11/04* (2013.01); *Y10T 403/602* (2015.01)

(58) Field of Classification Search
CPC ............... B60R 11/04; B60R 2011/004; G06T 2207/30252
(Continued)

(56) References Cited

U.S. PATENT DOCUMENTS 6,894,619 B1    5/2005  Schmitt et al.
6,924,638 B2    8/2005  Muramatsu et al.
(Continued)

FOREIGN PATENT DOCUMENTS

CN    1361734 A    7/2002
CN    101020439 A    8/2007
(Continued)

OTHER PUBLICATIONS

Chinese Office Action dated Jun. 3, 2015 with English-language translation (eleven (11) pages).
(Continued)

*Primary Examiner* — Helen Kwok
*Assistant Examiner* — Nashmiya Fayyaz
(74) *Attorney, Agent, or Firm* — Crowell & Moring LLP (57) ABSTRACT

A fastening arrangement of a sensor element, in particular a camera, on a fastening element of a motor vehicle involves holding the sensor element on a holding element of the fastening element by means of a force generated by a spring region of a spring element and orientated in one direction. The spring element has a second spring region connected at least indirectly to the first spring region and running at angle to the first spring region, which the sensor element adjoins in a second direction that runs at an angle to the first direction.

13 Claims, 5 Drawing Sheets

(58) Field of Classification Search
USPC ........................................................ 73/866.5
See application file for complete search history.

(56) References Cited

U.S. PATENT DOCUMENTS

| | | | | |
|---|---|---|---|---|
| 8,192,095 | B2* | 6/2012 | Kortan | ................. B60S 1/0881 156/221 |
| 8,356,948 | B2* | 1/2013 | Onishi | .................... B60R 11/04 396/419 |
| 2004/0108849 | A1* | 6/2004 | Muramatsu | ............. B60B 27/00 324/174 |
| 2007/0164188 | A1 | 7/2007 | Mordau et al. | |
| 2007/0205348 | A1 | 9/2007 | Schmitt et al. | |
| 2008/0092673 | A1 | 4/2008 | Hansel et al. | |
| 2008/0117074 | A1 | 5/2008 | Wohlfahrt et al. | |
| 2011/0155874 | A1 | 6/2011 | Roehr et al. | |
| 2011/0233248 | A1 | 9/2011 | Flemming et al. | |
| 2013/0334268 | A1* | 12/2013 | Huttenlocher | .......... B60R 11/02 224/533 |

FOREIGN PATENT DOCUMENTS

| | | |
|---|---|---|
| DE | 102 56 835 A1 | 6/2004 |
| DE | 20 2006 017 362 U1 | 4/2008 |
| DE | 10 2008 044 840 A1 | 3/2010 |
| DE | 10 2008 050 320 A1 | 4/2010 |
| DE | 10 2006 040 213 B4 | 2/2014 |
| EP | 1 810 896 A2 | 7/2007 |
| JP | 2004-76789 A | 3/2004 |
| JP | 2007-225601 A | 9/2007 |
| JP | 2008-256397 A | 10/2008 |
| WO | WO 2005/095168 A1 | 10/2005 |
| WO | WO 2008/068573 A2 | 6/2008 |
| WO | WO 2010/037500 A2 | 4/2010 |

OTHER PUBLICATIONS

German language Written Opinion (PCT/ISA/237) dated Oct. 30, 2012 (five (5) pages).
International Search Report dated Oct. 30, 2012 with English translation (five (5) pages).
German-language Office Action issued in German counterpart application No. 10 2011 108 594.0 dated Nov. 13, 2015 (Six (6) pages).
Japanese Office Action dated Feb. 3, 2015, including partial English translation (nine (9) pages).
Japanese Office Action issued in counterpart Japanese Application No. 2014-521966 dated Aug. 30, 2016 with partial English-language translation (seven (7) pages).

* cited by examiner

FASTENING ARRANGEMENT OF A CAMERA ON A FASTENING ELEMENT OF A MOTOR VEHICLE

BACKGROUND AND SUMMARY OF THE INVENTION

Exemplary embodiments of the invention relate to a fastening arrangement of a sensor element, in particular a camera, on a fastening element of a motor vehicle.

German patent document DE 10 2008 050 320 A1 discloses a carrier device for fastening to a screen, in particular a windscreen, of a motor vehicle. The carrier device comprises a carrier plate that can be fastened to the screen, which is created at least in some regions from a plastic and by which at least one camera, one sensor or suchlike are borne. The plastic of the carrier plate is displaced by a filler material, in particular a glass filler material.

The carrier plate can comprise a carrier arrangement having two upper carrier elements and two lower carrier elements, against which the camera is to be loaded with a force that is orientated in one direction. This force is generated by a spring arrangement having two spring elements. The camera is pressed against reference areas of the carrier elements by means of the spring elements.

Exemplary embodiments of the present invention are directed to a fastening arrangement of a sensor element, in particular a camera, on a fastening element of a motor vehicle, wherein the camera is held on the fastening element in a particularly cost-effective manner.

In such a fastening arrangement of a sensor element, in particular a camera, on a fastening element of a motor vehicle, the sensor element is held on a holding element of the fastening element by means of a force. Here, the force is generated by a spring region of a spring element of the fastening arrangement. When loaded with this force, which is orientated in one direction, the camera is thus held on the holding element.

According to the invention, the spring element has at least one second spring region connected at least indirectly to the first spring region and runs at an angle, in particular perpendicular, to the first spring region, which the sensor element adjoins in a second direction that runs at an angle, in particular perpendicular, to the first direction. In other words, the spring element, with its two spring regions, enables a multi-axial fastening of the sensor element on the fastening element, since the spring, with its two spring regions, can act along a first axis, i.e. in the first direction, and along a second axis, i.e. in the second direction.

The first spring region thus fixes and fastens the sensor element on the holding element relative to the fastening element, while the second spring region of the spring element serves as a bearing for the sensor element and, if necessary, enables, at the same time, a tolerance compensation, as a result of production-related tolerances of the fastening element and/or sensor element. Thus, several functions are integrated into the one spring element. This functional integration keeps the number of parts of the fastening arrangement low, which entails particularly low costs for the fastening arrangement. Furthermore, a particular low weight of the fastening arrangement results from the low number of parts, which benefits a low weight of the motor vehicle that is designed, for example, as a personal motor vehicle.

Preferably, in the fastening arrangement according to the invention, only the one spring element is provided, by means of which the sensor element is held on the fastening element. This keeps the number of parts, the costs and the weight of the fastening arrangement according to the invention particularly low. Moreover, a simple, fast and cost-effective assembly of the sensor element on the fastening element is thus carried out, since only the one spring element is to be assembled.

In a further advantageous embodiment of the invention, the holding element of the fastening element has a receiver, in particular an undercut, in which the sensor element is held by means of the force caused by the spring element. To that end, the sensor element, in particular a housing thereof, preferably has a receiving part, wherein, advantageously, an outer contour of the receiving part is formed at least in some regions as a counter contour that at least substantially corresponds to a receiving contour of the receiver. Thus, a particularly precise assembly of the sensor element on the fastening element is possible, such that the sensor element can be positioned and fastened in a simple manner in a desired relative position with respect to the fastening element. The spring element can at least substantially compensate for potential, in particular production-related tolerances, in particular by means of the second spring region.

It is thus possible, for example, to configure and assemble the sensor element at least substantially with angular precision relative to the fastening element. This is then particularly advantageous if the sensor element is formed as a camera. Here, this can be, for example, a so-called night-vision camera, by means of which images can be taken, even at night, and can be depicted on at least one screen in a cockpit of the motor vehicle.

In a further advantageous embodiment, the spring element is locked with the fastening element. To that end, the fastening element has, for example, at least one locking element, with which the spring element is to be locked or clipped. This locking or clipping enables a particularly fast, and therefore fast and cost-effective, assembly of the sensor element on the fastening element, which leads to considerable cost savings, in particular in line with series production with a large number of units.

Furthermore, it has been shown to be advantageous if the spring element has a third spring region connected at least indirectly to the first spring region and runs at an angle, in particular perpendicular, to the first spring region, which the sensor element adjoins in the second direction, wherein the first spring region is arranged between the second and the third spring region, in particular at least substantially in the center. Thus, the sensor element can adjoin the spring element on both sides of the first spring region, such that a particularly defined and, in particular, tilt-free clamping of the sensor element on the fastening element is implemented. This has a benefit for the positioning of the sensor element relative to the fastening element, and thus the functional fulfillment of the sensor element, since this is configured in a defined manner relative to the fastening element and also relative to the remaining motor vehicle.

In a further advantageous embodiment of the invention, the spring element adjoins the fastening element via the second and/or third spring region in the second direction. This means that the second and/or third spring region is arranged between the fastening element and the sensor element, wherein the second and/or third spring region rests at least indirectly against a plane of the fastening element pointing towards the sensor element and running at an angle, in particular perpendicular, to the second direction. Thus, the sensor element is configured with particular precision relative to the fastening element and thus to the remaining motor vehicle. In particular, tolerances can thereby be compensated for particularly advantageously.

The sensor element can be held, in particular pressed, by also applying the force of the spring element in the direction of the plane of the fastening element and thus, if necessary, against the second and/or third spring region. In other words, the sensor element is loaded with force by means of the spring element, in particular by means of the first spring region, both in the first direction and in the second direction, such that the sensor element is held to the fastening element particularly tightly and precisely at the same time.

In a further advantageous embodiment of the invention, the spring element has a grip region that connects to the first spring region and runs at an angle to the first spring region, by means of which grip region the spring element can be handled. This means that the spring element is to be assembled on, and disassembled from, the fastening element in a particularly simple, comfortable and thus fast and cost-effect manner via this grip region that runs at an angle to the first spring region. In particular, it is possible to carry out the assembly of the spring element from above in the vertical direction of the vehicle in a particularly ergonomic manner for a person carrying out the assembly.

In a further advantageous embodiment, the spring element is formed in a single piece, which keeps the number of parts, the weight and the costs of the fastening arrangement according to the invention particularly low. Alternatively, or in addition, the fastening element can be formed in a single piece, which also leads to a low number of parts, to a low weight as well as to low costs.

In a further advantageous embodiment, the fastening element is formed from a plastic. This keeps the weight of the fastening arrangement low, which leads to a particularly low weight of the motor vehicle.

In an advantageous embodiment of the invention, the spring element is at least substantially formed from a metallic material. This has a benefit for the elastic properties of the spring regions, wherein these can be formed with particular elasticity. Thus, the sensor element can be held tightly on the fastening element under application of a relatively high level of force.

Further advantages, features and details of the invention arise from the description of a preferred exemplary embodiment below, as well as with the aid of the figure. The features and combinations of features specified in the description above and the features and combinations of features specified below in the description of the figures and/or in the figures only can be used not only in the combination specified in each case, but also in other combinations or on their own without exceeding the scope of the invention.

DETAILED DESCRIPTION

Figure 1:
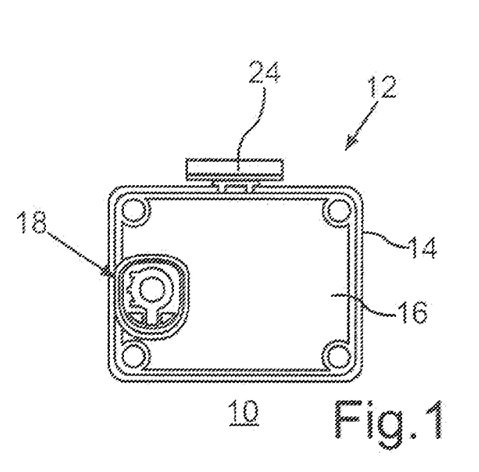
FIG. 1 a schematic rear view of a night-vision camera for a motor vehicle, in particular a personal motor vehicle, which is to be fastened on a fastening element of the personal motor vehicle.

FIG. 1 shows a night-vision camera 10 for a personal motor vehicle. The night-vision camera 10 is a camera module that comprises a housing 12 having a first housing part 14 and a second housing part 16. The housing parts 14, 16 are connected to one another through formation of a receiving space, wherein electronic components of the night-vision camera 10 are arranged in the receiving space, in particular protected from water.

A plug connection 18 is arranged on a rear side of the night-vision camera 10, which can be seen in FIG. 1, via which the night-vision camera 10 is to be connected to a plug and, above this, for example, to an electrical system and to a data bus of the personal motor vehicle. Thus, electrical energy and electrical signals can be supplied to the night-vision camera 10. It is also possible to lead electrical signals away from the night-vision camera 10.

Figure 2:
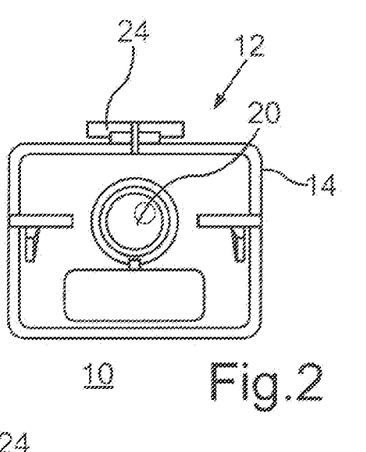
FIG. 2 a schematic front view of the night-vision camera according to FIG. 1.

As can be seen with the aid of FIG. 2, a lens 20 is arranged on a front side of the night-vision camera 10, via which light or light reflections can penetrate the receiving space towards optical detection means of the night-vision camera 10. The night-vision camera 10 or its optical detection means have a particularly high level of light sensitivity, such that, even in darkness, they detect images from the surroundings and can depict them on at least one screen in a cockpit of the personal motor vehicle. This benefits driving safety, since the driver of the personal motor vehicle can see elements via the screen that are impossible or very difficult to see with the human eye, such as pedestrians, barriers and/or suchlike.

Figure 3:
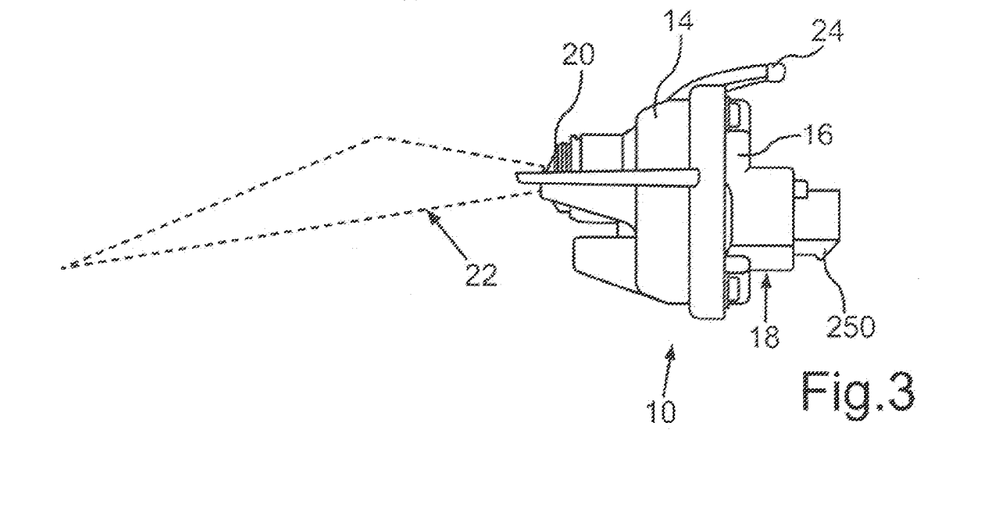
FIG. 3 a schematic side view of a night-vision camera according to FIGS. 1 and 2, with a schematic depiction of a connector outlet and a field of vision of the night-vision camera.

FIG. 3 shows the night-vision camera 10 in its side view, wherein a field of vision 22 of the night-vision camera 10 is indicated. Furthermore, a connector outlet 250 is to be seen in FIG. 3, which illustrates how the plug is to be connected to the night-vision camera 10 via the plug connection 18.

A fastening bolt 24 of the night-vision camera 10 is also illustrated in FIGS. 1 to 3, which is formed by the housing 12. The housing 12, and thus the fastening bolt 24, are formed, for example, from a plastic. The night-vision camera 10 can be fastened on a fastening element 27 (FIG. 4) of the personal motor vehicle via the fastening bolt 24, and thus can be held on the personal motor vehicle.

FIGS. 4 to 7 thus show a fastening arrangement 28 of the night-vision camera 10 on the fastening element 27 that is at least substantially formed from a plastic, which element comprises a fastening plate 26. The night-vision camera 10 is held on the remaining personal motor vehicle by the fastening element 27.

As illustrated in particular from the side view in FIG. 3, the fastening bolt 24 has, on its external peripheral side, a contour that differs from a circular contour. In other words, the fastening bolt 24 is formed to be non-round on its external peripheral side. Thus, an anti-twist protection is created, such that the night-vision camera 10 is assembled on the fastening element 27 in a defined manner and with angular precision in a desired relative position with respect to the fastening plate 26, and thus with respect to the remaining personal motor vehicle, and cannot rotate around an axis of rotation that extends at least substantially in the transverse direction of the vehicle or at least substantially parallel to the longitudinal extension direction of the fastening bolt 24.

Figure 4:
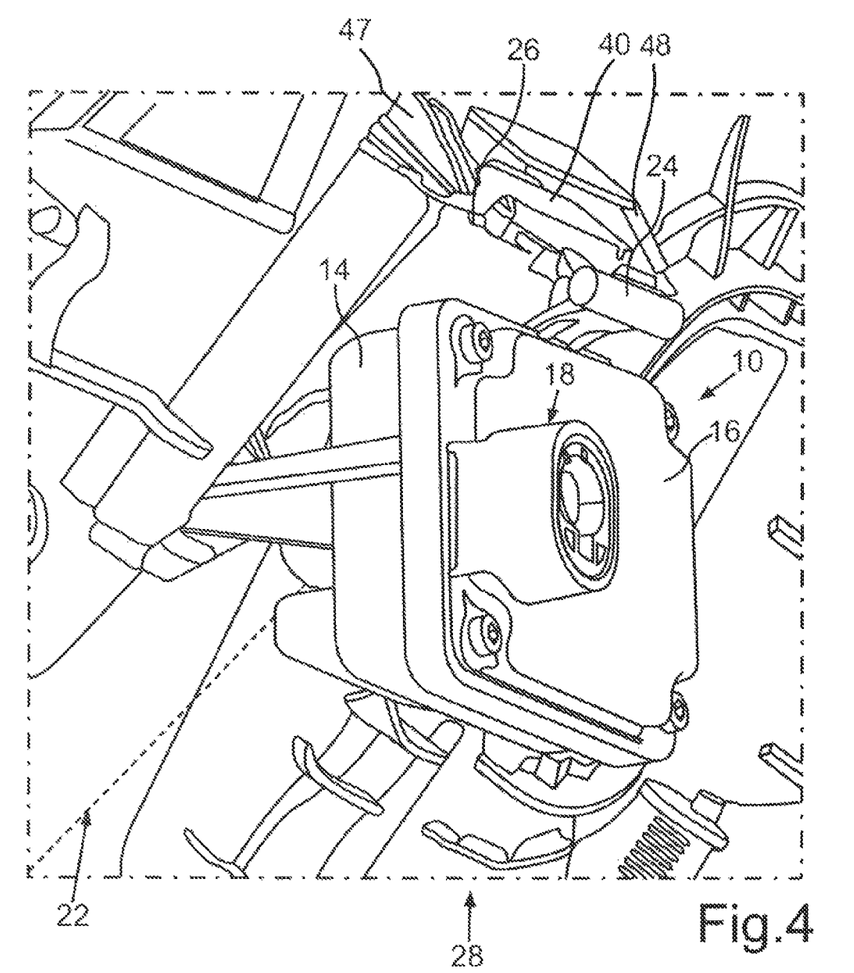
FIG. 4 an extract of a schematic, perspective view of a fastening arrangement of the night-vision camera according to FIGS. 1 to 3 on a fastening element of a personal motor vehicle.
Figure 5:
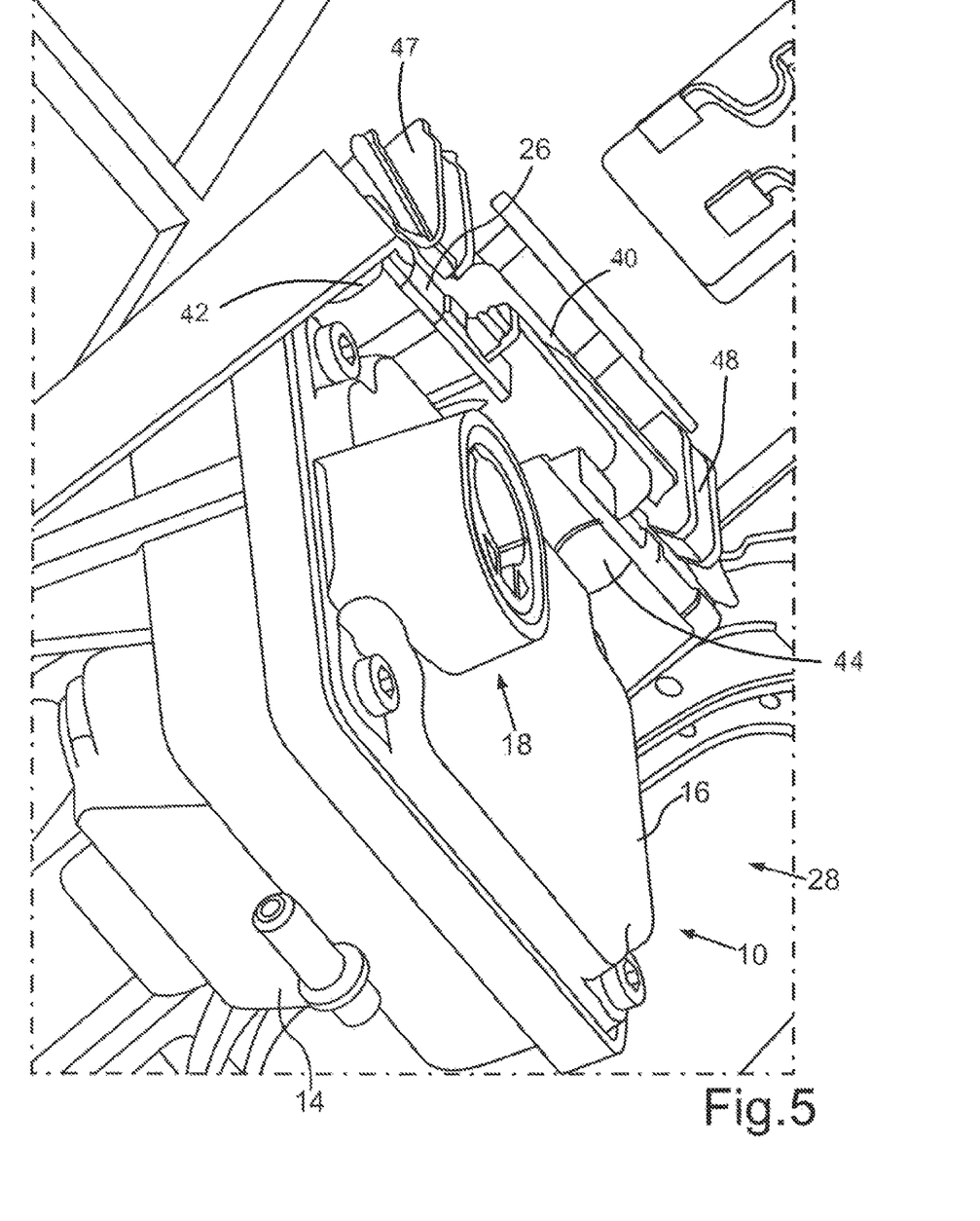
FIG. 5 an extract of a further schematic, perspective view of the fastening arrangement according to FIG. 4.
Figure 6:
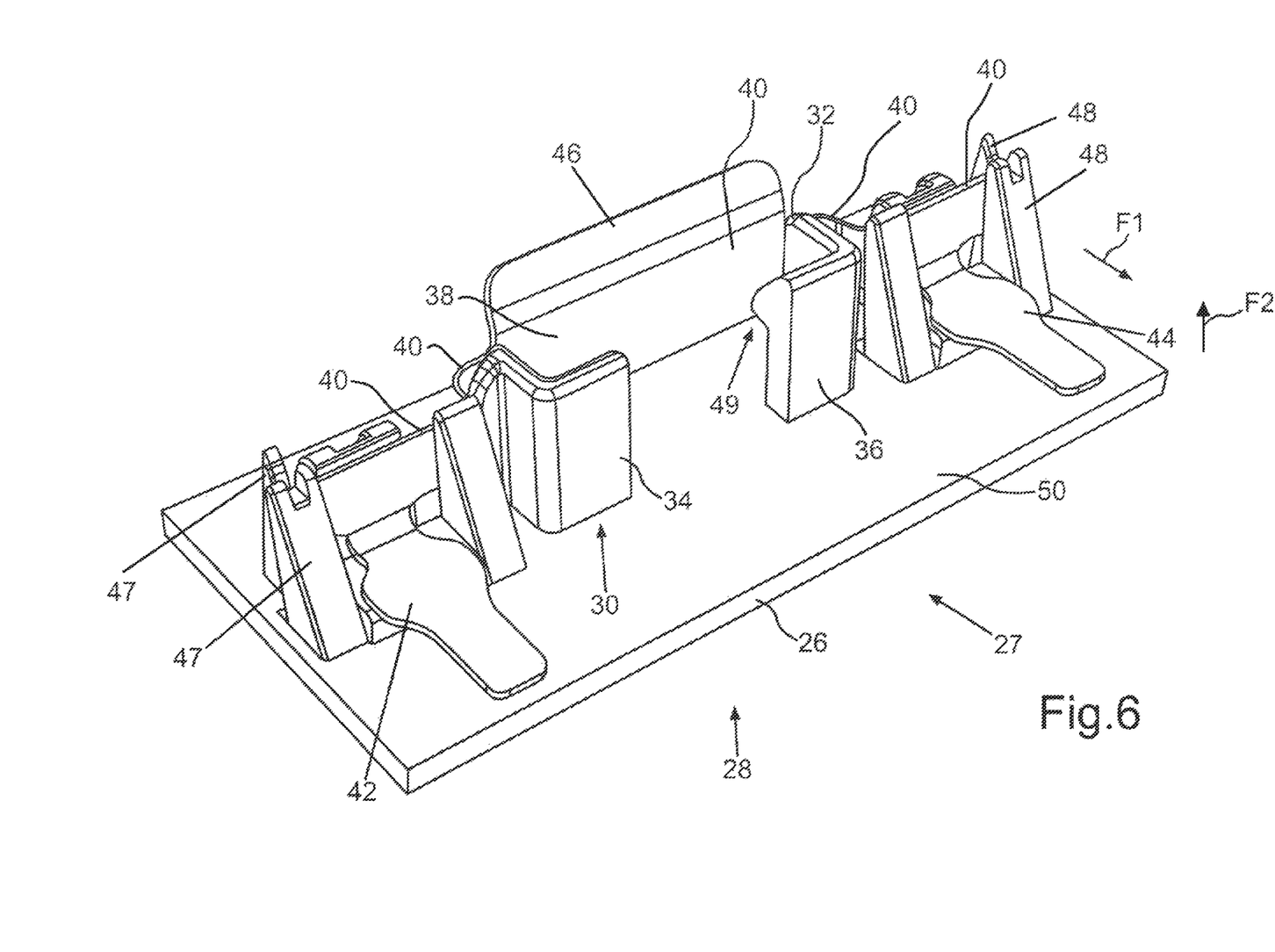
FIG. 6 an extract of a further schematic, perspective view of the fastening arrangement according to FIGS. 4 and 5 without the night-vision camera.
Figure 7:
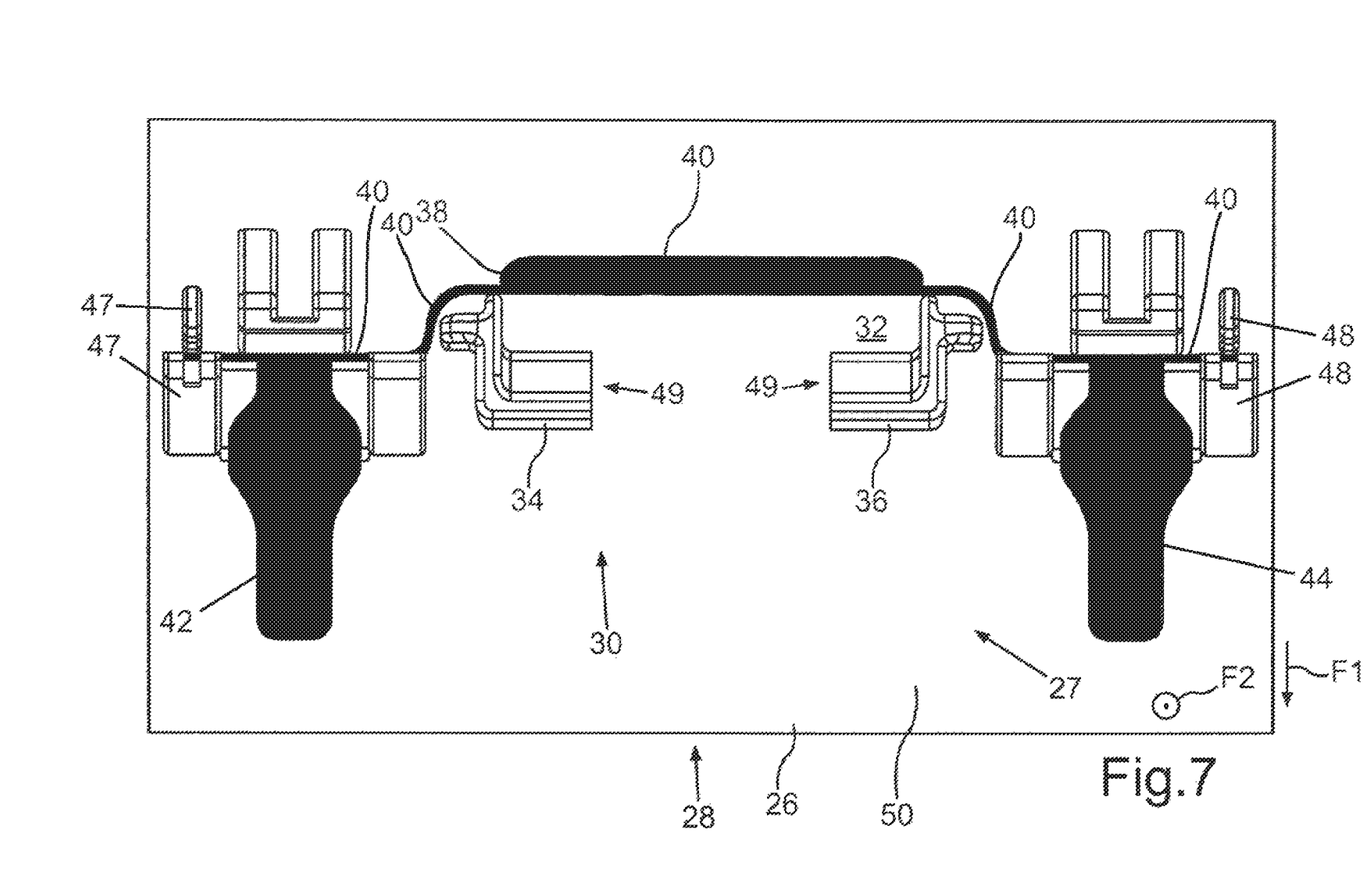
FIG. 7 an extract of a schematic front view of the fastening arrangement according to FIG. 6.

As can be seen from FIGS. 4 and 5, and in particular FIGS. 6 and 7, the fastening element 27 has a holding element 30 arranged on the fastening plate, which holding element 30 has a receiver 32. The receiver 32 is in this case partially bordered by a first holding part 34 and partially bordered by a second holding part 36 of the holding element 30. In order to keep the number of parts, and therefore the costs, of the fastening arrangement 28 low, the holding parts 34, 36 are formed as a single piece with the fastening plate 26, which is made from plastic. The fastening bolt 24 is secure from twisting in the fastening arrangement 28 and is arranged with angular precision in the receiver 32 and is fixed in the receiver by means of a force.

Here, the force is illustrated by a first force arrow F1, runs in a first direction at least substantially parallel to the fastening plate 26 and is generated by means of a first spring region 38 of a spring element 40 of the fastening arrangement 28. On the one side, a second spring region 42 of the spring element 40 is connected to the first spring region 38. On the other side of the first spring region 38, a third spring region 44 of the spring element 40 is connected to the first spring region 38. The spring regions 38, 42, 44 are thus formed as a single piece with one another, wherein the spring element 40 is thus formed as a single-piece sheet component made from a metallic material, as shown by the contrasted region in FIG. 7 for example.

Latching elements 47, 48 formed as a single piece with the fastening plate 26 are provided to fasten the spring element 40 on the fastening plate 26. The first latching element 47 is, in this case, allocated to the second spring region 42, while the second latching element 48 is allocated to the third spring region 44. The spring element 40 is thus locked with the respective latching elements 47, 48 via its spring regions 42, 44, and is thus clipped with the fastening element 27. Thus, a fast and cost-effective assembly is possible. To represent a particularly fast and cost-effective assembly, a grip region 46 of the spring element 40 is connected to the first spring region 38, which runs at least substantially at an angle to the first spring region 38. The spring element 40 can be handled particularly simply via the grip region 46 and thus can be clipped with the fastening element 27 and disassembled from it again in a simple manner.

As illustrated in FIGS. 6 and 7, the first spring region 38 is arranged between the spring regions 42, 44 and thus represents an intermediate spring part, which fixes the fastening bolt 24, which is, for example a front fastening bolt of the night-vision camera 10, in the receiver 32. This means that the first spring region 38 presses the fastening bolt 24 into the receiver 32 in the first direction.

As illustrated in FIG. 6, the receiver 32 has an undercut 49, such that the fastening bolt 24 and thus the night-vision camera 10 are also held in the receiver 32 in a second direction that runs at least substantially perpendicular to the fastening plate 26.

The outer spring regions 42, 44 serve as a bearing for the night-vision camera 10 on both sides of the first spring region 38, such that the night-vision camera 10 is also held on the fastening element 27 by means of the spring element 40 in the second direction that runs at an angle, in particular perpendicular, to the first direction. This second direction is illustrated by a second force arrow F2 and runs at least substantially perpendicular to the fastening plate 26. This means that the night-vision camera 10 adjoins the spring regions 42, 44 in the second direction via its housing 12, and is also held on the fastening element 27 under application of force in the second direction by means of the spring element 40. The spring regions 42, 44 that are located on the one side with the housing 12 are located on the other side with a surface 50 of the fastening plate 26, which faces the night-vision camera 10, in the support bearing and serve to compensate for production-related tolerances, for example. It is thus possible to configure the night-vision camera 10 with angular precision and precisely relative to the fastening element 27 and thus relative to the personal motor vehicle, such that its field of vision 22 is configured advantageously relative to the remaining personal motor vehicle. This has a benefit for the functional fulfillment of the night-vision camera 10.

Hence it is apparent that the spring element 40, due to its three spring regions 38, 42, 44, enables a multi-axial fastening of the night-vision camera 10 on the fastening element 27. It is thus possible to hold the night-vision camera 10 on the fastening element 27 exclusively by means of the one spring element 40. The depicted functional integration of the spring element 40 leads to a low number of parts and thus to a low weight, as well as to low costs of the fastening arrangement 28.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A fastening arrangement for a motor vehicle, comprising:
 a camera of the motor vehicle, the camera having a housing with a fastening bolt;
 a fastening element of the motor vehicle configured to hold the camera, wherein the fastening element includes:
  a fastening plate having a surface,
  a holding element that is configured to receive and hold the fastening bolt of the camera and the holding element is integrally arranged on the fastening plate, wherein the holding element has a receiver bordered by a first holding part and a second holding part, and
  a spring element having: (i) a first spring that is opposite of the first and second holding parts of the receiver and (ii) a second spring that is connected at least indirectly to the first spring and is positioned adjacent to the holding element;
 wherein the fastening bolt of the camera is held and locked into the holding element of the fastening element by a force generated by the first spring of the spring element in a first direction that is approximately parallel to the surface of the fastening plate, and
 wherein the second spring is configured to adjoin and press onto the housing of the camera by a force generated by the second spring of the spring element in a second direction away from the fastening plate at an angle relative to the first direction so as to prevent slacking of the camera.

2. The fastening arrangement according to claim 1, wherein the receiver of the holding element has an undercut, which allows the camera to be locked in the receiver by the force generated by the first spring of the spring element.

3. The fastening arrangement according to claim 1, wherein the spring element is separately attachable to the fastening element.

4. The fastening arrangement according to claim 3, wherein the separately attachable spring element is attached to and locked with the fastening element via a first latching element.

5. The fastening arrangement according to claim 1, wherein the spring element has a third spring connected at least indirectly to the first spring, wherein the third spring is configured to adjoin and press onto the housing of the camera by a force generated by the third spring of the spring element in the second direction away from the fastening plate so as to prevent slacking of the camera, wherein the first spring is between the second spring and the third spring.

6. The fastening arrangement according to claim 5, wherein the first spring is arranged in a center between the second spring and the third spring.

7. The fastening arrangement according to claim 3, wherein the separately attachable spring element is attached to and locked with the fastening element via a second latching element.

8. The fastening arrangement according to claim 1, wherein the first spring of the spring element has a grip region to allow the spring element to be operated.

9. The fastening arrangement according to claim 1, wherein the spring element is formed as a single piece.

10. The fastening arrangement according to claim 4, wherein the fastening plate, the holding element, and the first latching element are formed as a single piece.

11. The fastening arrangement according to claim 1, wherein the fastening element is plastic.

12. The fastening arrangement according to claim 1, wherein the fastening element is at least substantially a metallic material.

13. The fastening arrangement according to claim 1, wherein the angle of the second direction relative to the first direction is approximately perpendicular.

\* \* \* \* \*